Patented Sept. 12, 1922.

1,428,946

UNITED STATES PATENT OFFICE.

CROMWELL B. DICKEY, OF MILWAUKEE, WISCONSIN, ASSIGNOR TO PITTSBURGH PLATE GLASS COMPANY, OF PITTSBURGH, PENNSYLVANIA, A CORPORATION OF PENNSYLVANIA.

MANUFACTURE OF CALCIUM ARSENATE.

No Drawing.  Application filed August 7, 1920. Serial No. 401,980.

*To all whom it may concern:*

Be it known that I, CROMWELL B. DICKEY, a citizen of the United States, residing at Milwaukee, in the county of Milwaukee and State of Wisconsin, have invented a new and useful Improvement in the Manufacture of Calcium Arsenate, of which the following is a specification.

The present invention relates to the manufacture of calcium arsenate and will be clearly understood from the following description thereof.

In the manufacture of calcium arsenate $(Ca_3(AsO_4)_2)$ by the reaction of arsenic acid upon calcium hydrate $Ca(OH)_2$ in suspension in water, soluble acid compounds of arsenic are frequently formed in the product regardless of the care with which the materials are selected and the conditions of reaction are controlled. The presence of the soluble arsenic has been variously ascribed to the formation of calcium monohydric arsenate, calcium tetrahydric arsenate, or to the formation of a compound which breaks down in the presence of water to form a soluble arsenate.

In accordance with the present invention the arsenate produced by the reaction of arsenic acid on calcium hydrate may be largely or substantially freed from soluble arsenic compounds either during or after manufacture by the presence of an aqueous suspension of calcium hydrate containing a concentration of calcium hydrate in actual solution (solution concentration) higher than normal for the temperature of the solution, with which suspension the soluble arsenic compound (or arsenic acid) may react. The higher solution concentration of the calcium hydrate in the suspension may be secured by the addition thereto of a suitable soluble compound, for instance, a halide of an alkali metal, such as salt. The soluble compound so added should not, by its own dissociation, increase the calcium ion concentration of the solution, or its addition will result in a decrease of the solution concentration of the calcium hydrate. The quantity of the soluble compound added may be varied within wide limits, as quantities up to 50% of the CaO content of the suspension are found to be effective. The use of a small proportion, say 1 to 5% is preferred.

In the process of manufacturing calcium arsenate, arsenic acid is added slowly to a suspension of calcium hydrate in water, formed preferably by freshly slaking lime, the proportions of the materials being substantially those required for reaction, having an excess of calcium hydrate so that a product containing from 40 to 50% $As_2O_5$ results. The dilution of the calcium hydrate may be varied according to the usual practice in the art to vary the fineness of the product. To reduce the soluble arsenic a suitable soluble compound, such as dairy salt, is added to the lime suspension before the addition of the arsenic acid is begun. The quantity of salt added may be as high as 50% of the lime of the suspension, but it is preferred that 1 to 5% be employed. A small proportion of the added salt, say from a trace to .5% of the product, is permitted to remain in the product and appears to retard or prevent the tendency for the formation of soluble arsenic compounds therein.

In treating calcium arsenate containing soluble arsenic to reduce or eliminate the latter, it is suspended in water with a small amount of slaked lime (say 5%) and about 1% salt and maintained at about 60° C. for 2 to 4 hours. An arsenate containing 2% or more of soluble arsenate may thus have the soluble arsenic content reduced to 0.5% or less.

As the precise character of the soluble arsenic compound or compounds to which the soluble $As_2O_5$ in the arsenate product is due is not definitely known to me, nor the character of the stages of the reaction between it and the calcium hydrate, the term soluble arsenic compound has been used to designate it or them in the preceding description and in the following claims. Furthermore, the details of the specific examples above given are not intended to be regarded as limitations upon the scope of the invention, except in so far as included in the accompanying claims.

I claim:

1. The process of producing calcium arsenate largely or substantially free from soluble arsenic compounds which consists in producing a reaction between the soluble arsenic compound and calcium hydrate in a suspension in water having a higher solution concentration than normal for the temperature.

2. The process of producing calcium arsenate largely or substantially free from soluble arsenic compounds which consists in producing a reaction between the soluble arsenic compound and calcium hydrate in a suspension in water containing 1 to 5% of salt.

3. The process of manufacturing calcium arsenate which consists in bringing together arsenic oxide and calcium hydrate in a suspension in water having a higher solution concentration than normal for the temperature.

4. The process of manufacturing calcium arsenate which consists in forming a suspension of calcium hydrate in water, adding thereto a compound capable of increasing the solution concentration of the calcium hydrate, and admixing arsenic acid therewith.

5. The process of manufacturing calcium arsenate which consists in forming a suspension of calcium hydrate in water, adding salt in amount up to fifty per cent of the lime thereto and admixing arsenic acid therewith.

6. The process of forming calcium arsenate substantially free from soluble arsenic compounds which comprises supplying salt in an aqueous suspension of calcium arsenate containing suspended calcium hydrate.

7. The process of forming calcium arsenate substantially free from soluble arsenate compounds wherein calcium arsenate is present in suspension in water in the presence of said soluble compounds which comprises supplying calcium hydrate and a soluble compound capable of increasing the solution of the concentration of calcium hydrate in water above that normal for the temperature.

8. As an article of manufacture, calcium arsenate containing a small proportion of salt.

9. As an article of manufacture, calcium arsenate containing from a trace to 0.5% of salt and not above 0.5% of soluble arsenic.

CROMWELL B. DICKEY.